(12) United States Patent
Koetsch et al.

(10) Patent No.: US 12,517,014 B2
(45) Date of Patent: Jan. 6, 2026

(54) METHOD FOR EXTRACTING ROTOR DYNAMIC ORBIT FROM BLADE TIP CLEARANCE AND TIME OF ARRIVAL MEASUREMENTS

(71) Applicant: Raytheon Technologies Corporation, Farmington, CT (US)

(72) Inventors: Christopher T. Koetsch, East Longmeadow, MA (US); Richard A. Lomenzo, Jr., Enfield, CT (US); Philip Andrew Varney, Coventry, CT (US)

(73) Assignee: RTX Corporation, Farmington, CT (US)

( * ) Notice: Subject to any disclaimer, the term of this patent is extended or adjusted under 35 U.S.C. 154(b) by 303 days.

(21) Appl. No.: 18/198,342

(22) Filed: May 17, 2023

(65) Prior Publication Data

US 2024/0385081 A1    Nov. 21, 2024

(51) Int. Cl.
*G01M 15/14* (2006.01)
*F01D 21/00* (2006.01)
*G01B 21/16* (2006.01)

(52) U.S. Cl.
CPC .......... *G01M 15/14* (2013.01); *F01D 21/003* (2013.01); *G01B 21/16* (2013.01)

(58) Field of Classification Search
CPC ....... G01M 15/14; F01D 21/003; G01B 21/16
See application file for complete search history.

(56) References Cited

U.S. PATENT DOCUMENTS

| | | |
|---|---|---|
| 6,785,635 B2 | 8/2004 | von Flotow |
| 7,775,107 B2 | 8/2010 | Holmquist |
| 8,560,266 B2 | 10/2013 | Zielinski |
| 9,068,471 B2 | 6/2015 | Klingels |
| 11,145,960 B2 | 10/2021 | Costello et al. |
| 2014/0007591 A1 | 1/2014 | Khibnik et al. |

FOREIGN PATENT DOCUMENTS

JP    2003232673 A    8/2003

OTHER PUBLICATIONS

Extended European Search Report for counterpart EP Application No. 24175797 dated Oct. 23, 2024.

*Primary Examiner* — Eric S. McCall
(74) *Attorney, Agent, or Firm* — Bachman & LaPointe, P.C.

(57) ABSTRACT

A system for determining rotor-dynamic orbit information including an engine case supporting at least one engine stage, each at least one engine stage including a rotor having blades; at least one blade tip sensor operatively coupled to the engine case and in operative communication with the blades; at least one compensation sensor in operative communication with the at least one blade tip sensor; and an orbit controller in operative communication with the at least one blade tip sensor and the at least one compensation sensor.

18 Claims, 5 Drawing Sheets

METHOD FOR EXTRACTING ROTOR DYNAMIC ORBIT FROM BLADE TIP CLEARANCE AND TIME OF ARRIVAL MEASUREMENTS

BACKGROUND

The present disclosure is directed to a system and method of determining rotor-dynamic orbits from blade tip clearance and time of arrival measurements.

Current measurements of rotor dynamic orbits in turbomachinery can be limited to proximity probes located 90 degrees apart and directed at a continuous rotor or shaft surface. Current methods of measuring rotor dynamic orbits can require special test instrumentation located deep in an engine to allow for sensors at the necessary locations. The instrumentation can limit the measurements to a single shaft axial location. The legacy method can require significant cost and time.

What is needed is a system and method for determining the rotor-dynamic orbit information by utilizing blade tip clearance and time of arrival measurements.

SUMMARY

In accordance with the present disclosure, there is provided a system for determining rotor-dynamic orbit information comprising an engine case supporting at least one engine stage, each at least one engine stage including a rotor having blades; at least one blade tip sensor operatively coupled to the engine case and in operative communication with the blades; at least one compensation sensor in operative communication with the at least one blade tip sensor; and an orbit controller in operative communication with the at least one blade tip sensor and the at least one compensation sensor.

A further embodiment of any of the foregoing embodiments may additionally and/or alternatively include the at least one blade tip sensor is configured to sense the location of the blades relative to the engine case.

A further embodiment of any of the foregoing embodiments may additionally and/or alternatively include the at least one compensation sensor is configured to sense the location of the at least one blade tip sensor relative to the engine case and configured to indicate the relative motion of the at least one blade tip sensor.

A further embodiment of any of the foregoing embodiments may additionally and/or alternatively include the orbit controller is configured to utilize measurements of tip clearance and tip timing data to extract a dynamic orbit for a single stage of the engine.

A further embodiment of any of the foregoing embodiments may additionally and/or alternatively include the orbit controller is configured to align each of the dynamic orbits determined for each measured at least one stage of the engine.

A further embodiment of any of the foregoing embodiments may additionally and/or alternatively include the orbit controller is configured to provide an estimate of a full rotor dynamic shape of a combination of each of the at least one stage of the engine.

A further embodiment of any of the foregoing embodiments may additionally and/or alternatively include the system for determining the rotor-dynamic orbit information further comprising a blade monitoring system in operative communication with the orbit controller.

In accordance with the present disclosure, there is provided a system for determining rotor-dynamic orbit information comprising a gas turbine engine having at least one engine stage; an engine case supporting the at least one engine stage, each at least one engine stage including a rotor having a plurality of blades; at least one blade tip sensor operatively coupled to the engine case surrounding the plurality of blades within the at least one engine stage, the at least one blade tip sensor in operative communication with the plurality of blades; at least one compensation sensor in operative communication with the at least one blade tip sensor; and an orbit controller in operative communication with the at least one blade tip sensor and the at least one compensation sensor.

A further embodiment of any of the foregoing embodiments may additionally and/or alternatively include the system for determining the rotor-dynamic orbit information further comprising a blade monitoring system in operative communication with the orbit controller.

A further embodiment of any of the foregoing embodiments may additionally and/or alternatively include the at least one blade tip sensor is configured to sense the location of the blades relative to the engine case.

A further embodiment of any of the foregoing embodiments may additionally and/or alternatively include the at least one compensation sensor is configured to sense the location of the at least one blade tip sensor relative to the engine case and configured to indicate the relative motion of the at least one blade tip sensor.

A further embodiment of any of the foregoing embodiments may additionally and/or alternatively include the orbit controller is configured to utilize measurements of tip clearance and tip timing data to extract a dynamic orbit for a single stage of the engine.

A further embodiment of any of the foregoing embodiments may additionally and/or alternatively include the orbit controller is configured to align each of the dynamic orbits determined for each measured at least one engine stage; wherein the orbit controller is configured to provide an estimate of a full rotor dynamic shape of a combination of each of the at least one engine stage.

In accordance with the present disclosure, there is provided a process for determining rotor-dynamic orbit information comprising providing an engine case supporting at least one engine stage, each at least one engine stage including a rotor having blades; operatively coupling at least one blade tip sensor to the engine case; the at least one blade tip sensor in operative communication with the blades; coupling at least one compensation sensor in operative communication with the at least one blade tip sensor; and placing an orbit controller in operative communication with the at least one blade tip sensor and the at least one compensation sensor.

A further embodiment of any of the foregoing embodiments may additionally and/or alternatively include the process further comprising determining an absolute reference frame for the at least one blade tip sensor.

A further embodiment of any of the foregoing embodiments may additionally and/or alternatively include the process further comprising synthesizing a single stage rotor orbit.

A further embodiment of any of the foregoing embodiments may additionally and/or alternatively include the process further comprising determining the at least one engine stage rotor orbit.

A further embodiment of any of the foregoing embodiments may additionally and/or alternatively include the process further comprising configuring the orbit controller to align each rotor orbit determined for each measured at least one engine stage.

A further embodiment of any of the foregoing embodiments may additionally and/or alternatively include the process further comprising aligning each of the at least one engine stage rotor orbit across an engine.

A further embodiment of any of the foregoing embodiments may additionally and/or alternatively include the process further comprising configuring the orbit controller to provide an estimate of a full rotor dynamic shape of a combination of each of the at least one engine stage.

Other details of the system and method for determining the rotor-dynamic orbit information by utilizing blade tip clearance and time of arrival measurements are set forth in the following detailed description and the accompanying drawings wherein like reference numerals depict like elements.

DETAILED DESCRIPTION

Figure 1:
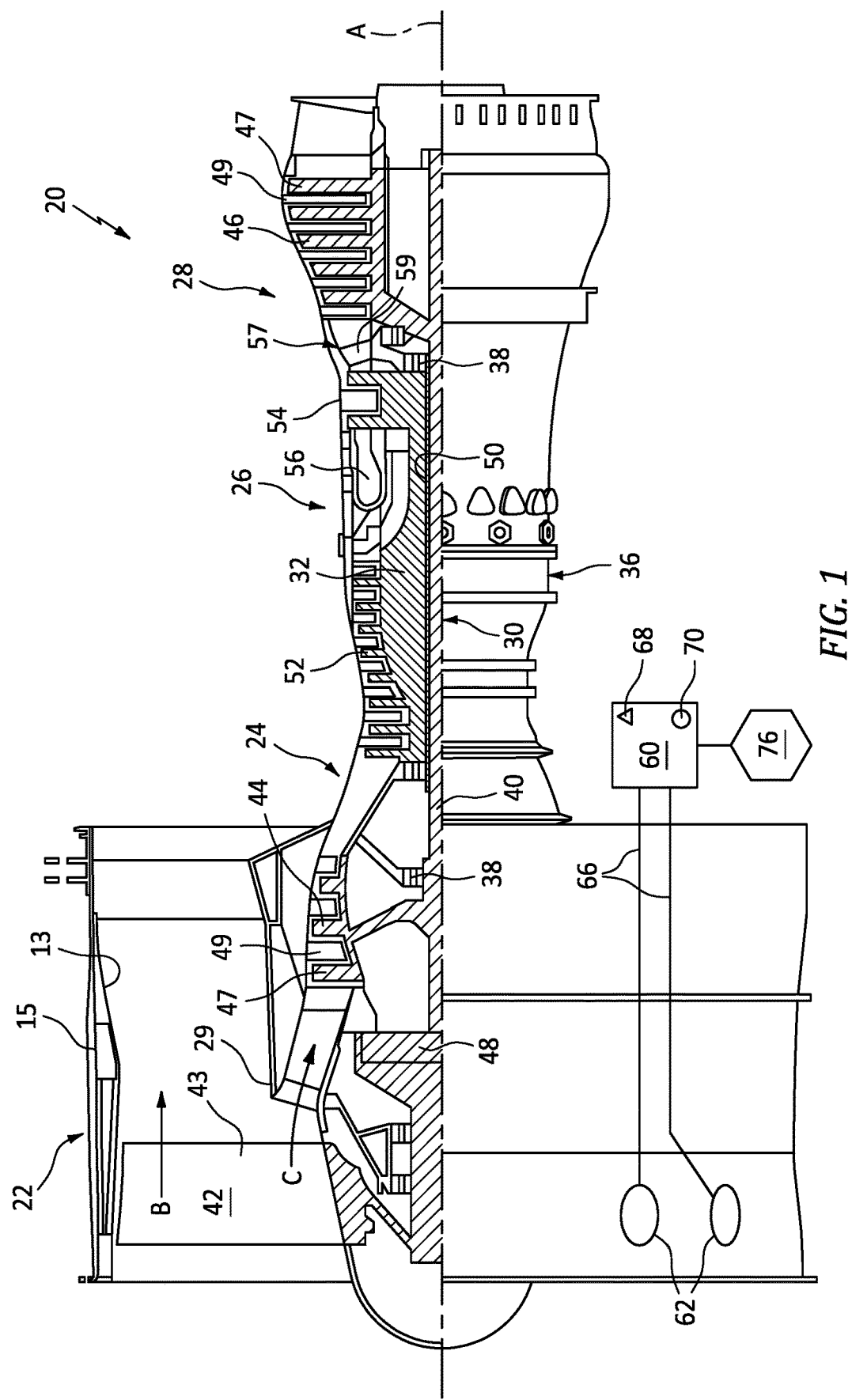
FIG. 1 is a cross section view of an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 may include a single-stage fan 42 having a plurality of fan blades 43. The fan blades 43 may have a fixed stagger angle or may have a variable pitch to direct incoming airflow from an engine inlet. The fan 42 drives air along a bypass flow path B in a bypass duct 13 defined within a housing 15 such as a fan case or nacelle, and also drives air along a core flow path C for compression and communication into the combustor section 26 then expansion through the turbine section 28. A splitter 29 aft of the fan 42 divides the air between the bypass flow path B and the core flow path C. The housing 15 may surround the fan 42 to establish an outer diameter of the bypass duct 13. The splitter 29 may establish an inner diameter of the bypass duct 13. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in the exemplary gas turbine engine 20 is illustrated as a geared architecture 48 to drive the fan 42 at a lower speed than the low speed spool 30. The inner shaft 40 may interconnect the low pressure compressor 44 and low pressure turbine 46 such that the low pressure compressor 44 and low pressure turbine 46 are rotatable at a common speed and in a common direction. In other embodiments, the low pressure turbine 46 drives both the fan 42 and low pressure compressor 44 through the geared architecture 48 such that the fan 42 and low pressure compressor 44 are rotatable at a common speed. Although this application discloses geared architecture 48, its teaching may benefit direct drive engines having no geared architecture. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

Airflow in the core flow path C is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core flow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The low pressure compressor 44, high pressure compressor 52, high pressure turbine 54 and low pressure turbine 46 each include one or more stages having a row of rotatable airfoils. Each stage may include a row of static vanes adjacent the rotatable airfoils. The rotatable airfoils and vanes are schematically indicated at 47 and 49.

The engine 20 may be a high-bypass geared aircraft engine. The bypass ratio can be greater than or equal to 10.0 and less than or equal to about 18.0, or more narrowly can be less than or equal to 16.0. The geared architecture 48 may be an epicyclic gear train, such as a planetary gear system or a star gear system. The epicyclic gear train may include a sun gear, a ring gear, a plurality of intermediate gears meshing with the sun gear and ring gear, and a carrier that supports the intermediate gears. The sun gear may provide an input to the gear train. The ring gear (e.g., star gear system) or carrier (e.g., planetary gear system) may provide an output of the gear train to drive the fan 42. A gear reduction ratio may be greater than or equal to 2.3, or more narrowly greater than or equal to 3.0, and in some embodiments the gear reduction ratio is greater than or equal to 3.4. The gear reduction ratio may be less than or equal to 4.0. The fan diameter is significantly larger than that of the low pressure compressor 44. The low pressure turbine 46 can have a pressure ratio that is greater than or equal to 8.0 and in some embodiments is greater than or equal to 10.0. The low pressure turbine pressure ratio can be less than or equal to 13.0, or more narrowly less than or equal to 12.0. Low pressure turbine 46 pressure ratio is pressure measured prior to an inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans. All of these parameters are measured at the cruise condition described below.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of pounds-mass per hour 1 bm/hr of fuel flow rate being burned divided by pounds-force 1 bf of thrust the engine produces at that minimum point. The engine parameters described above, and those in the next paragraph are measured at this condition unless otherwise specified.

"Low fan pressure ratio" is the pressure ratio across the fan blade 43 alone, without a Fan Exit Guide Vane ("FEGV") system. A distance is established in a radial direction between the inner and outer diameters of the bypass duct 13 at an axial position corresponding to a leading edge of the splitter 29 relative to the engine central longitudinal axis A. The low fan pressure ratio is a spanwise average of the pressure ratios measured across the fan blade 43 alone over radial positions corresponding to the distance. The low fan pressure ratio can be less than or equal to 1.45, or more narrowly greater than or equal to 1.25, such as between 1.30 and 1.40. "LOW corrected fan tip speed" is the actual fan tip speed in ft/see divided by an industry standard temperature correction of $[(Tram\ °R)/(518.7\ °R)]^{0.5}$. The "low corrected fan tip speed" can be less than or equal to 1150.0 ft/second (350.5 meters/second), and greater than or equal to 1000.0 ft/second (304.8 meters/second).

Figure 2:
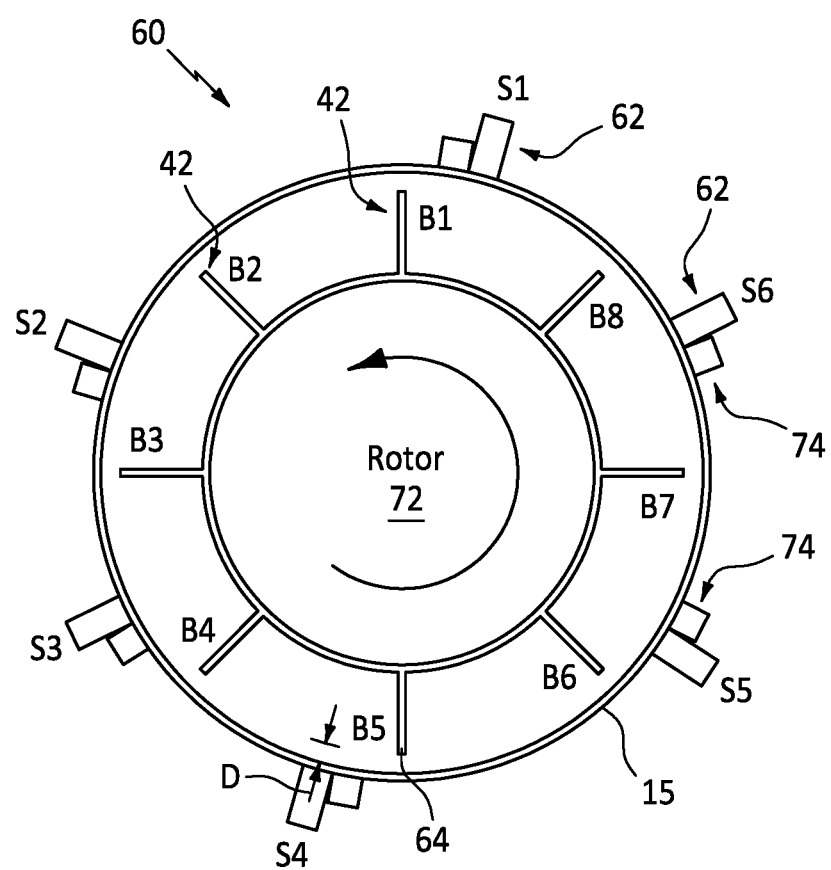
FIG. 2 is a schematic representation of an exemplary blade monitoring system and tip clearance probe configuration.

Referring also to FIG. 2, the example gas turbine engine 20 includes a blade monitoring system 60. The example blade monitoring system 60 includes at least one blade tip clearance sensor 62 that is mounted to the fan case 15 surrounding the plurality of fan blades 42 within the fan section 22. The blade monitoring system 60 receives signals each time one of the fan blades 42 passes in close proximity to the tip sensors 62. In this example, a tip 64 of the fan blade 42 passes proximate the tip sensors 62. The system 60 utilizes the signals for detecting and assessing vibratory modes occurring in each of the fan blades 42. The blade monitoring system 60 can also detect blade tip clearance.

As appreciated although the example system 60 is described by way of example with regard to fan blades 42 of the fan section 22, other airfoils such as those provided in the compressor and turbine sections 24, 28 are also within the contemplation of this disclosure.

The tip sensor 62 can be disposed within the fan case 15 and mounted such that the sensor 62 detects a portion of the fan blade 42 at a location spaced at a distance D from the blade 42. Although an example distance D is disclosed, other distance and relative angular orientation relative to the fan blade 42 may be utilized for the sensor within the contemplation of this disclosure.

The example sensor 62 can be any known sensor and is located within the fan case 15 radially outboard of the fan blade 42. It should be understood that any sensor configuration for sensing the presence and path of a fan blade are also within the contemplation of this disclosure. Moreover, although two sensors are shown in FIG. 1, the disclosed system and method may operate with one or more sensors 62 as shown in FIG. 2, is within the contemplation of this disclosure.

The sensor 62 registers the presence of the fan blade tip 64 as the tip 64 passes the sensor 62 during rotation about the axis A and generates a signal 66. A signal level 68 of the signal 66 is indicative of a distance between the tip 64 of the fan blade 42 and the sensor 62. The example signal 66 is an electrical signal such as a current or voltage produced by the sensor 62 and communicated to the system 60. In this example, passing of the tip 64 of the fan blade 42 past the sensor 62 generates a sine wave shaped signal 66 indicative of a path of the fan blade 42. As the tip 64 of the fan blade 42 becomes spaced a greater distance away from the sensor 62, the slope 70 of the signal 66 at a zero crossing point decreases. The timing of the fan blade 42 passing the sensor 62 can also be measured with the monitoring system 60.

The monitoring system 60 can be coupled with the fan section 22, the compressor section 24 and the turbine section 28 to obtain data across multiple stages along the entire gas turbine engine 20. The rotors 72 of the low pressure compressor 44, low pressure turbine 46, high pressure compressor 52, high pressure turbine 54 and fan 42 can be monitored.

Each of the sensors 62 can include a compensation sensor 74 in operative communication with the sensors 62. The compensation sensor 74 can be configured to indicate the relative motion of the sensors 62. During operation of the gas turbine engine 20, the sensors 62 can vibrate and be displaced. The rotors 72 can also be displaced and move relative to the case 15. The displacement of the sensors 62 and the rotors 72 can influence the measurements of the blade tip 64 clearance. The compensation sensor 74 can be utilized to provide data which can be employed to compensate for the relative motion of the sensor 62 and create an absolute measurement. The absolute measurement can create an absolute reference frame for the sensor 62. The relative motion of the sensor 62 can be subtracted from the relative distance from the blade tip to the sensor to place the distance in an absolute reference frame. Compensation can be accomplished by subtracting the time or frequency-domain signals of the compensation sensors from the sensors. Compensation can also be accomplished by the orbit controller in real-time so that the output is in an absolute reference frame. Additionally, the rotor 72 motion can also be provided with an absolute reference frame for the rotor 72. The compensation sensors can be configured to measure position, velocity, or acceleration.

Figure 3:
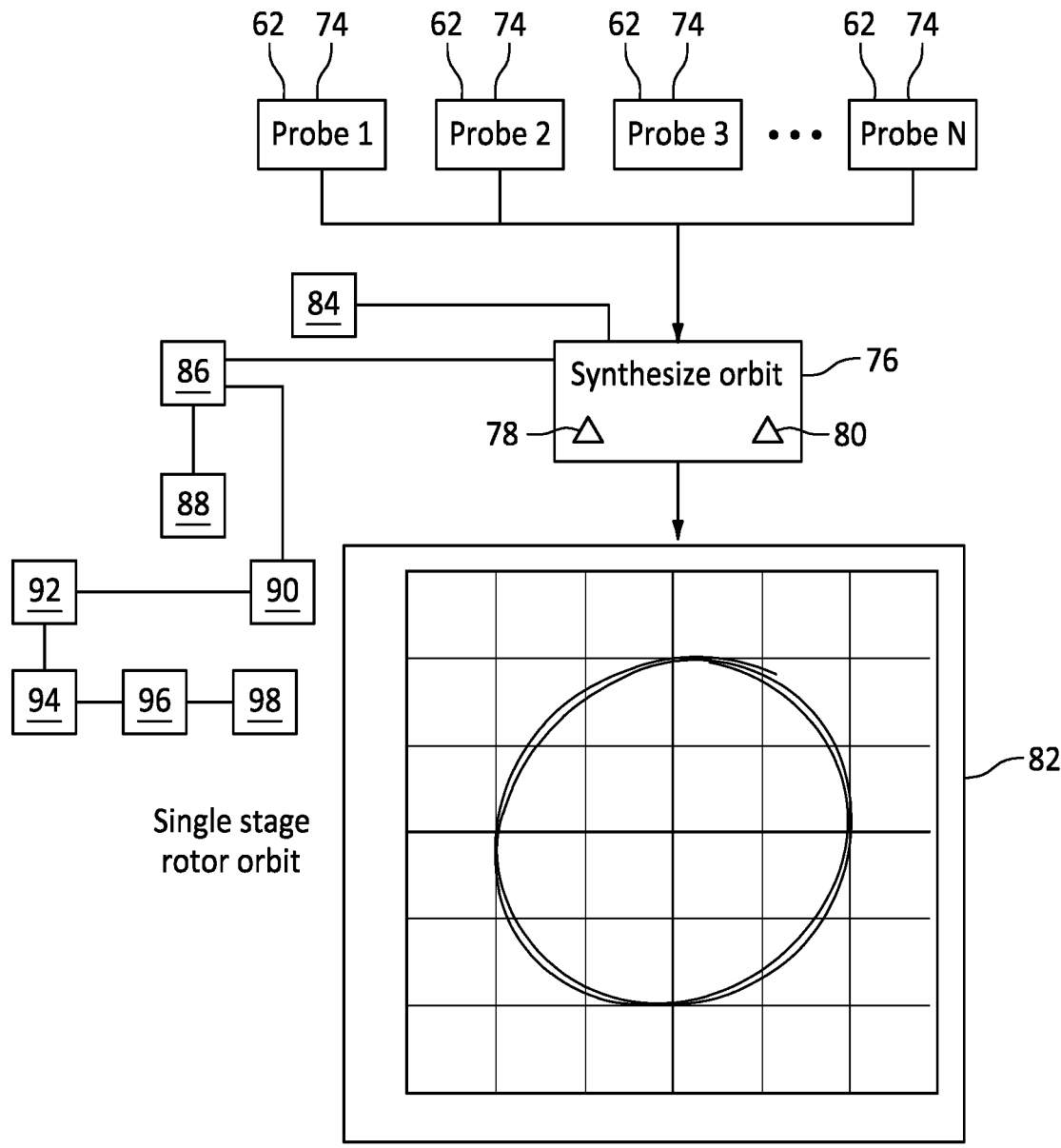
FIG. 3 is a schematic representation of an exemplary process diagram for single stage rotor orbit.

Referring also to FIG. 3, the diagram for single stage rotor orbit is shown. Each sensor 62 output along with the compensation sensor 74 output is combined into an orbit controller 76. The orbit controller 76 can be integrated with the blade monitoring system 60 or be configured independent. The orbit controller 76 also receives input from the rotor 72. The orbit controller 76 synthesizes the outputs from the sensors 62, 74 and determines an absolute sensor reference frame 78. The orbit controller 76 also determines an absolute rotor reference frame 80. The orbit controller 76 can utilize the measurements of the tip clearance and tip timing data to extract a dynamic orbit 82 for a single rotor stage of the engine 20. The dynamic orbit 82 represents a particular orbital pattern for a given rotor stage in a given engine 20.

The orbit controller 76 may include hardware, firmware, and/or software components that are configured to perform the functions disclosed herein, including the functions of the system and method for determining the rotor-dynamic orbit information by utilizing tip clearance and time of arrival measurements. While not specifically shown, the orbit controller 76 may include other computing devices (e.g., servers, mobile computing devices, etc.) and computer systems which may be in communication with each other and/or the orbit controller 76 via a communication network 84 to perform one or more of the disclosed functions. The orbit controller 76 may include at least one processor 86 (e.g., a controller, microprocessor, microcontroller, digital signal processor, etc.), memory 88, and an input/output (I/O) subsystem 90. The orbit controller 76 may be embodied as any type of computing device e.g., a server, an enterprise computer system, a network of computers, a combination of computers and other electronic devices, or other electronic devices. Although not specifically shown, the I/O subsystem 90 typically includes, for example, an I/O controller, a memory controller, and one or more I/O ports. The processor 86 and the I/O subsystem 90 are communicatively coupled to the memory 88. The memory 88 may be embodied as any type of computer memory device (e.g., volatile memory such as various forms of random access memory).

The I/O subsystem 90 is communicatively coupled to a number of hardware, firmware, and/or software components, including a data storage device 92, a display 94, a communication subsystem 96, and a user interface (UI) subsystem 98. The data storage device 92 may include one or more hard drives or other suitable persistent storage devices (e.g., flash memory, memory cards, memory sticks, and/or others).

Figure 4:
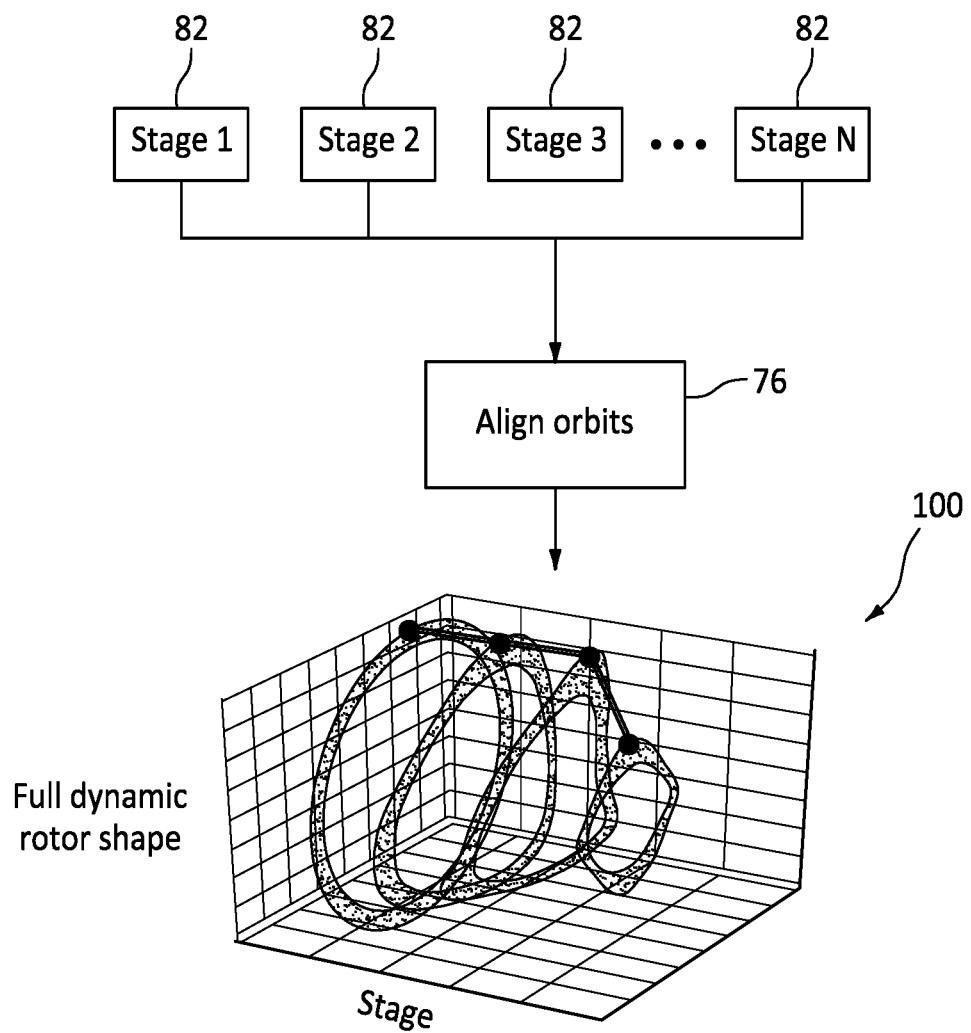
FIG. 4 is a schematic representation of an exemplary process diagram for full dynamic rotor orbit shape.

Referring also to FIG. 4, each of the single stage rotor dynamic orbits 82 determined for each stage can be combined and aligned employing the orbit controller 76. The blade tip clearance data across multiple stages can be aligned to provide an estimate of a full rotor dynamic shape 100 of all of the stages combined. The alignment process can be accomplished by aligning time of arrival timestamps or using a common signature shared across multiple stages. The common signature can be a rotor speed. The alignment can be accomplished by using characteristic fluctuations of rotor speed time of arrival signatures of response on the rotor. The process allows for compensation of sensor 62 measurements by use of the compensation sensor 74 located on/near the tip sensor 62 configured to compensate the relative motion of the tip sensor 62 with the absolute sensor measurement. The various systems that are utilized to make the measurements of the blade tips and rotors do not have to be synchronized. The full dynamic rotor shape 100 can be used to validate models of the entire engine 20. The full dynamic rotor shape can be used for health and safety monitoring of the engine operation.

Figure 5:
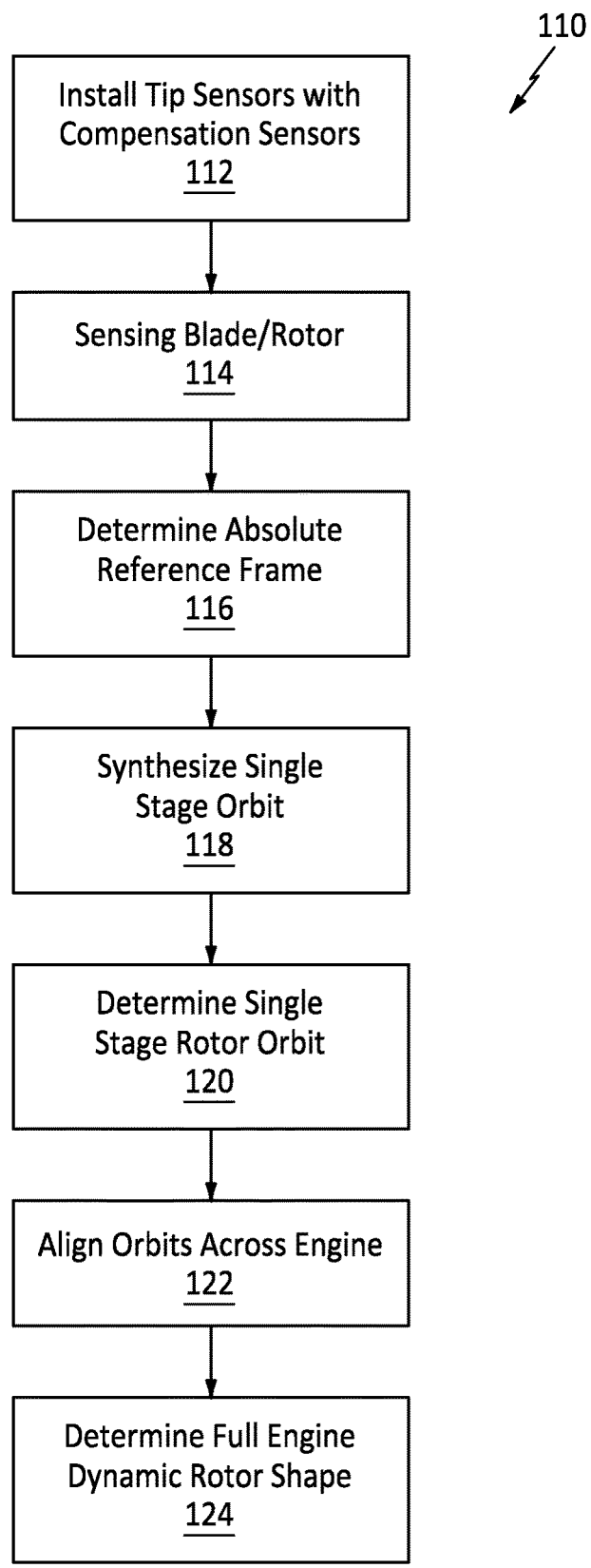
FIG. 5 is a process diagram.

Referring also to FIG. 5, a process map is shown. The process 110 can include a step 112 where the tip sensor 62 and compensation sensor 74 can be installed. At step 114 the tip sensors 62 can sense the rotary motion of the blade 42 and rotor 72. At step 116, the absolute reference frame 78, 80 can be determined. At step 118, the single stage orbit can be synthesized. Synthesis can be accomplished by the controller by fitting an orbital shape to the measurements of at least 2 probes at each passing of a blade. Fitting can be accomplished using sensor measurements in the time or frequency-domain. The single stage rotor orbit can be determined at step 120. Step 122 includes alignment of the orbits of each stage across the engine 20. Step 124 includes determining the full engine dynamic rotor shape.

A technical advantage of the disclosed system and method for determining the rotor-dynamic orbit information can include generating new information from existing data captured using tip clearance probes.

Another technical advantage of the disclosed system and method for determining the rotor-dynamic orbit information can include utilizing already in place tip clearance probes configured for recording turbomachinery tip clearance.

Another technical advantage of the disclosed system and method for determining the rotor-dynamic orbit information can include no additional cost is required to measure the rotor-dynamic orbits.

Another technical advantage of the disclosed system and method for determining the rotor-dynamic orbit information can include a unique estimate of the 3D dynamic response of a shaft by use of synthesis and alignment of orbits from multiple rotor stages.

There has been provided a system and method for determining the rotor-dynamic orbit information. While the system and method for determining the rotor-dynamic orbit information has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A system for determining rotor-dynamic orbit information comprising:
   an engine case supporting at least one engine stage, each at least one engine stage including a rotor having blades;
   at least one blade tip sensor operatively coupled to the engine case and in operative communication with the blades;
   at least one compensation sensor in operative communication with the at least one blade tip sensor; and
   an orbit controller in operative communication with the at least one blade tip sensor and the at least one compensation sensor, wherein the at least one compensation sensor is configured to sense the location of the at least one blade tip sensor relative to the engine case and configured to indicate the relative motion of the at least one blade tip sensor.

2. The system for determining the rotor-dynamic orbit information according to claim 1, wherein the at least one blade tip sensor is configured to sense the location of the blades relative to the engine case.

3. The system for determining the rotor-dynamic orbit information according to claim 1, further comprising:
   a blade monitoring system in operative communication with the orbit controller.

4. The system for determining the rotor-dynamic orbit information according to claim 1, wherein the orbit controller is configured to utilize measurements of tip clearance and tip timing data to extract a dynamic orbit for a single stage of the engine.

5. The system for determining the rotor-dynamic orbit information according to claim 4, wherein the orbit controller is configured to align the dynamic orbits determined for the measured at least one stage of the engine.

6. The system for determining the rotor-dynamic orbit information according to claim 5, wherein the orbit controller is configured to provide an estimate of a full rotor dynamic shape of a combination of each of the at least one stage of the engine.

7. A system for determining rotor-dynamic orbit information comprising:
   a gas turbine engine having at least one engine stage;
   an engine case supporting the at least one engine stage, each at least one engine stage including a rotor having a plurality of blades;
   at least one blade tip sensor operatively coupled to the engine case surrounding the plurality of blades within the at least one engine stage, the at least one blade tip sensor in operative communication with the plurality of blades;
   at least one compensation sensor in operative communication with the at least one blade tip sensor; and
   an orbit controller in operative communication with the at least one blade tip sensor and the at least one compensation sensor, wherein the at least one compensation sensor is configured to sense the location of the at least one blade tip sensor relative to the engine case and configured to indicate the relative motion of the at least one blade tip sensor.

8. The system for determining the rotor-dynamic orbit information according to claim 7, wherein the orbit controller is configured to utilize measurements of tip clearance and tip timing data to extract a dynamic orbit for a single stage of the engine.

9. The system for determining the rotor-dynamic orbit information according to claim 7, wherein the orbit controller is configured to align the dynamic orbit determined for the measured at least one engine stage; wherein the orbit controller is configured to provide an estimate of a full rotor dynamic shape of the at least one engine stage.

10. The system for determining the rotor-dynamic orbit information according to claim 7, further comprising:
    a blade monitoring system in operative communication with the orbit controller.

11. The system for determining the rotor-dynamic orbit information according to claim 10, wherein the at least one blade tip sensor is configured to sense the location of the blades relative to the engine case.

12. A process for determining rotor-dynamic orbit information comprising:
    providing an engine case supporting at least one engine stage, each at least one engine stage including a rotor having blades;
    operatively coupling at least one blade tip sensor to the engine case; the at least one blade tip sensor in operative communication with the blades;
    coupling at least one compensation sensor in operative communication with the at least one blade tip sensor; and
    placing an orbit controller in operative communication with the at least one blade tip sensor and the at least one compensation sensor, wherein the at least one compensation sensor is configured to sense the location of the at least one blade tip sensor relative to the engine case and configured to indicate the relative motion of the at least one blade tip sensor.

13. The process of claim 12, further comprising: determining an absolute reference frame for the at least one blade tip sensor.

14. The process of claim 12, further comprising:
    determining a single stage rotor orbit.

15. The process of claim 12, further comprising:
    determining the at least one engine stage rotor orbit.

16. The process of claim 15, further comprising: configuring the orbit controller to align each rotor orbit determined for each measured at least one engine stage.

17. The process of claim 12, further comprising:
    aligning the at least one engine stage rotor orbit across an engine.

18. The process of claim 17, further comprising:
    configuring the orbit controller to provide an estimate of a full rotor dynamic shape of the at least one engine stage.

* * * * *